(12) United States Patent
Nago et al.

(10) Patent No.: US 8,684,334 B2
(45) Date of Patent: Apr. 1, 2014

(54) TENSION TRANSMITTING DEVICE

(75) Inventors: Susumu Nago, Nagoya (JP); Yasunori Noda, Nagoya (JP); Makoto Tamai, Nagoya (JP); Naohiro Hirayama, Daito (JP); Masaru Kuraishi, Daito (JP)

(73) Assignee: Nagaki Seiki Co., Ltd., Osaka (JP)

( * ) Notice: Subject to any disclaimer, the term of this patent is extended or adjusted under 35 U.S.C. 154(b) by 943 days.

(21) Appl. No.: 12/680,951

(22) PCT Filed: Oct. 3, 2008

(86) PCT No.: PCT/JP2008/068089
§ 371 (c)(1),
(2), (4) Date: Jul. 1, 2010

(87) PCT Pub. No.: WO2009/044881
PCT Pub. Date: Apr. 9, 2009

(65) Prior Publication Data
US 2010/0283018 A1    Nov. 11, 2010

(30) Foreign Application Priority Data

Oct. 4, 2007    (JP) .................................. 2007-261324

(51) Int. Cl.
*B21F 9/00*    (2006.01)

(52) U.S. Cl.
USPC ........................................................ 254/199

(58) Field of Classification Search
USPC ........................................ 254/222, 225, 199
See application file for complete search history.

(56) References Cited

FOREIGN PATENT DOCUMENTS

| CN | 2423261 | 3/2001 | |
|----|---------|--------|---|
| JP | 56-126112 | 9/1981 | |
| JP | 64-12911 | 1/1989 | |
| JP | 4-008109 | 1/1992 | |
| JP | 2001251746 A * | 9/2001 | ............... H02G 7/02 |
| JP | 2002-17011 | 1/2002 | |

OTHER PUBLICATIONS

Japan Office action, mail date is Jul. 17, 2012.
Taiwan Office action, mail date Jul. 19, 2013.

* cited by examiner

*Primary Examiner* — Emmanuel M Marcelo
(74) *Attorney, Agent, or Firm* — Greenblum & Bernstein P.L.C.

(57) ABSTRACT

A tension transmitting device includes a covering body placed over a target drop cable from a side thereof; and a tension transmission belt having a first end secured on a first end side of the covering body and a second end used as a free end, the tension transmission belt receiving the tension during stringing or wiring operation on a free end side thereof. The free end of the tension transmission belt extends from a secured portion thereof secured to the covering body so as to run on a covering surface side of the covering body and is wound around the drop cable. The covering body includes a slit provided on a second end side thereof, and the slit has a side receiving opening through which the tension transmission belt is received in a width direction.

4 Claims, 7 Drawing Sheets

TENSION TRANSMITTING DEVICE

TECHNICAL FIELD

The present invention relates to a tension transmitting device for transmitting tension to a target object such as a drop cable when the drop cable is strung or wired.

BACKGROUND TECHNOLOGY

Generally, drop cables are also referred to as DV cables. In many cases, as exemplified in FIG. 7, a drop cable c is strung between a utility pole a and a house b. Generally, in the wiring work for such an aerial drop cable c, a first end of the drop cable c is supported by a supporting tool (not shown) at a mounting point d of the house b. Then a second end side of the drop cable c is pulled up to a mounting point e of the utility pole a, and the drop cable c is tensioned, supported on a supporting tool (not shown), and thereby strung. The wiring length of the aerial drop cable c is generally about 10 m to about 50 m and about 20 m in average. The sag α of the cable strung overhead is defined according to the electricity distribution regulations of an electric power company. More specifically, the size of the electric wire is different (e.g., 3.2 mm$^2$ or less or 14 mm$^2$ or more) depending on the regulations, and the sag is about 2 to 4% of the length of the wire strung overhead, although it varies from season to season. To string the drop cable c with the above sag α maintained, a large tension must be applied to the drop cable c.

As described above, a large tension is transmitted to the drop cable c to pull up the second end side thereof to the mounting point e of the utility pole a and to tension the drop cable c. Since the drop cable c is a low-voltage cable (e.g., for 100 V), it is formed by lightly twisting 2 to 3 wires together to obtain the above size and has a relatively small diameter and low resistance to external force. Therefore, in one method used to transmit the tension, one end of a so-called fiber rope f formed of fibers is wound around the drop cable, as shown in FIG. 5, without using a cable gripping tool (sometimes referred to as "KAMURA") that clamps the wire between metal members.

Figure 5:
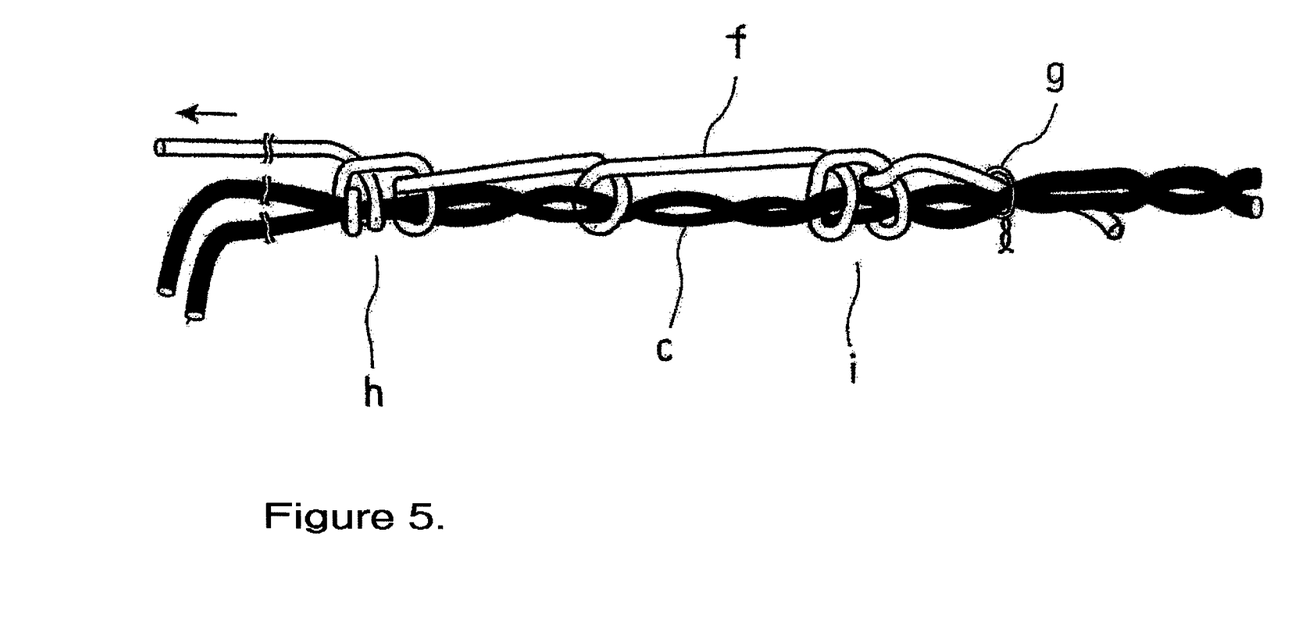
FIG. 5 is a side view illustrating a conventional connection state between a rope and a target drop cable when tension is transmitted through the rope.

To transmit the required tension to the drop cable c through the rope f wound thereon, a first end of the rope f is tightly bound to the drop cable c using a metal binding wire g, and the rope f extending from the tightly bound position toward the tension side is wrapped around the drop cable c at at least 3 positions spaced apart from each other as shown in FIG. 5. In this case, the rope f is wrapped in a simple manner at the intermediate position. However, at the starting position h on the tension side, the rope f is wrapped in a particularly complex manner to prevent slippage. At the end point i to which the tension is not applied, the rope f is wrapped in a relatively complex manner to prevent slippage to some extent. In this manner, the tension directly or indirectly applied to the rope f is transmitted to the drop cable c. At the initial stage of tension transmission, the wrapped portion of the rope f wrapped around the drop cable c is tightened around the drop cable c by the tension and fastens the drop cable c, and therefore the tension is reliably transmitted without slippage.

Figure 7:
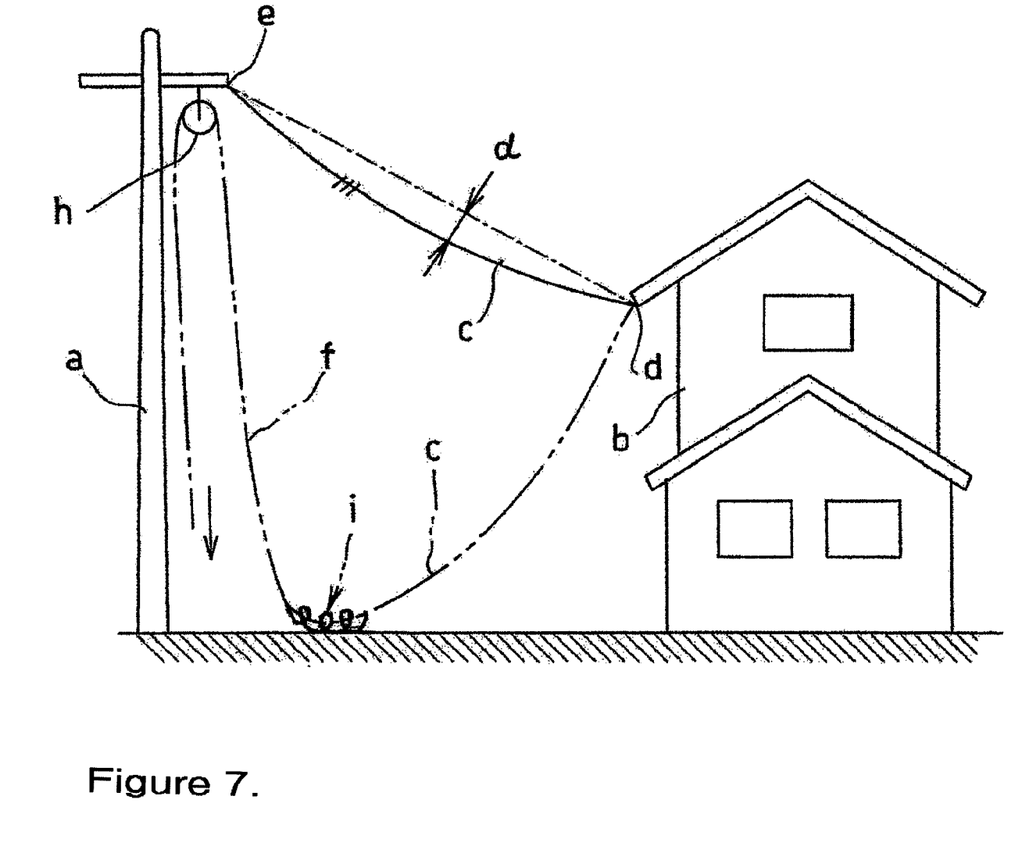
FIG. 7 is a schematic diagram illustrating a strung drop cable and stringing operation using a conventional rope with tension transmitted thereto.

The tension is directly transmitted to the rope f by pulling down the rope f connected to the drop cable c at a connection portion j shown in FIG. 7. More specifically, a second end of the rope f hung down through a pulley h supported near the mounting point e of the utility pole a is pulled down by, for example, man power, as shown by a phantom line in FIG. 7. Instead of man power, a winding machine or a manual operation wire tensioning device (sometimes referred to as "SHI-MERA") may be used. A connection tool such as a connection ring and a hook may be provided at the second end of the rope f. In this case, the connection tool is connected to a towing source to pull up and tension the second end of the drop cable c.

In any case, the rope f is wrapped around the drop cable c on the ground with the second end side of the drop cable c not pulled up as shown by the phantom line.

Figure 6:
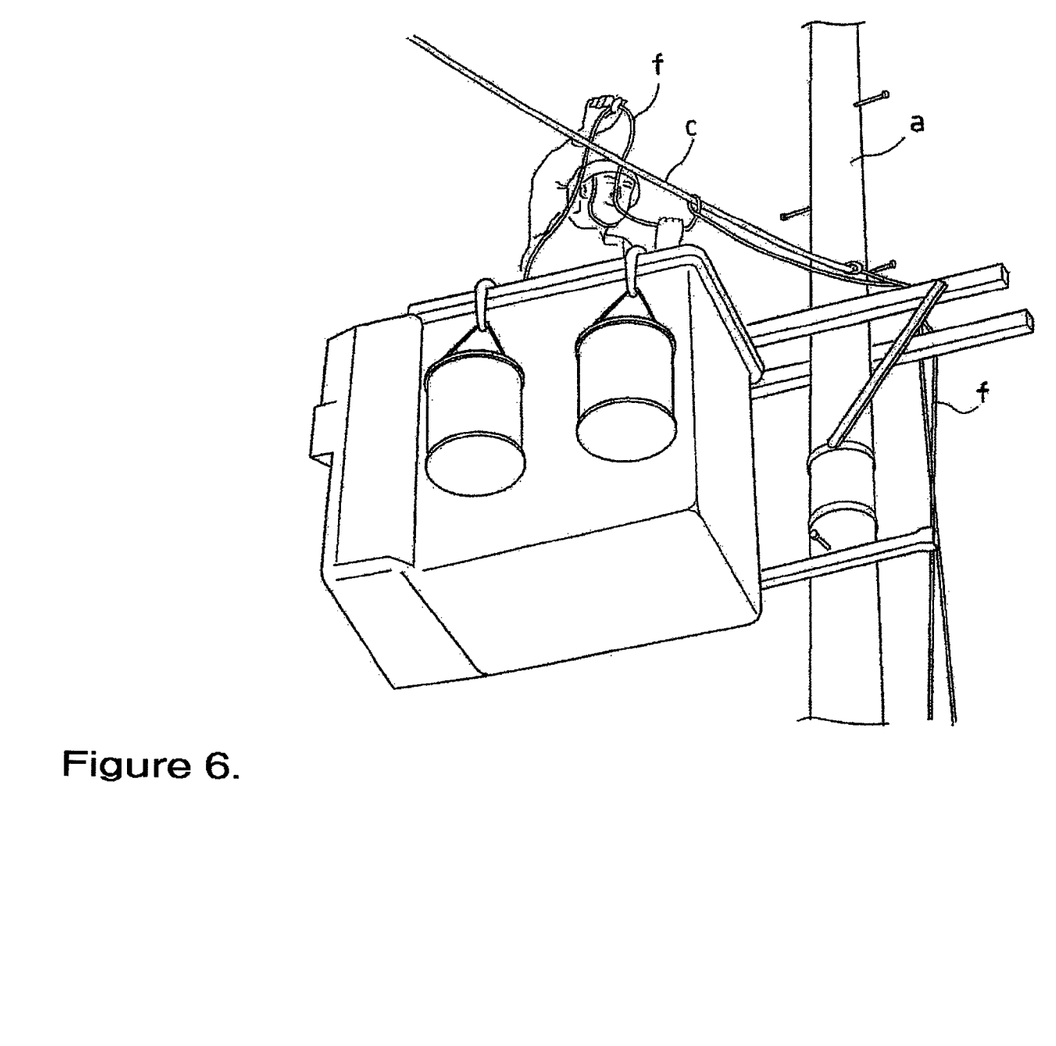
FIG. 6 is a perspective view illustrating an example of the connecting operation shown in FIG. 5 or removing operation when the operation is performed at a high place.

However, the second end side may be first pulled up toward the utility pole a and tensioned to some extent, and the drop cable c in a preliminary strung state may then be tensioned so as to satisfy a predetermined sag α. In this procedure, the rope f used for the tensioning operation is wrapped around the drop cable c held in the preliminary strung state, as shown in FIG. 6. In this case, the rope f is wrapped around the drop cable c at a high place as shown in FIG. 6.

In one known method for stringing and laying a cable using a messenger wire, first and second towropes tied together at their ends are used (see, for example, Patent Document 1). A brief description is given of this method. First, the first and second towropes are threaded through pulleys of first and last utility poles corresponding to the leading and trailing ends of the towropes and through pulleys of intermediate utility poles, and the leading and trailing ends of the second towrope are tied to the corresponding first and last utility poles. Next, the leading end of the first towrope is connected to the messenger wire through a swivel, and the trailing end of the first towrope is attached to a captor-in-drum. Then the first towrope is pulled toward the trailing end to string and lay the messenger wire. Next, a cable is connected to the leading end of the second towrope through a swivel. The second towrope is attached to the captor-in-drum and pulled, and the cable is thereby threaded through the pulleys. After the cable is strung, it is detached from the pulleys by a worker on a bucket car and attached to the messenger wire using cable hangers. Finally, the cable is hung from the messenger wire through the cable hangers.

[Patent Document 1] Japanese Patent Application Laid-Open No. 2002-17011.

DISCLOSURE OF THE INVENTION

Problems to be Solved by the Invention

In the conventional method in which the first end of the rope f is wrapped around the drop cable c to transmit tension, the first end of the rope f is first tightly bound to the drop cable c using the binding wire g, and then the rope f extending from the tightly bonded portion toward the tension side is wrapped around the drop cable c at, for example, 3 positions spaced apart from each other. Since the rope f must be wrapped in different complex manners depending on the position in consideration of the degree of resistance to slippage, the problem is that the wrapping work is complex and takes long time and the work efficiency is low. This is particularly problematic for the work at a high place shown in FIG. 6. The above workability problem also arises when the rope f is removed after the drop cable c is strung, and the removal work must be performed at a high place.

To ensure, during the transmission of the tension, the tightness of the winding of the rope f at the portion where the first end of the rope f is tightly bound to the drop cable c using the binding wire g, the rope f must be very tightly bound to the drop cable c so as to be prevented from being released from the bound portion bound by the binding wire g. Therefore, the thin binding wire g exerts a strong local external force on the coatings of the twisted wires of the drop cable c and on the inner wires thereof at the intersections between the binding wire g and the twisted wires and thereby bites into the coatings. In addition, the wrapped rope f exerts a relatively strong local external force on the coatings and inner wires of the drop cable c at the intersections between the rope f and the twisted wires. This is likely to cause damage to the drop cable c. After the wiring work, strong tension is continuously exerted on the drop cable c, and this is likely to damage the twisted wires.

With the wiring method described in Patent Document 1, the number of working steps is too large, and the work is complicated.

The above circumstances also occur when other wires and cables such as bypass cables are strung or wired.

It is an object of the present invention to provide a tension transmitting device that can be easily attached to and detached from a target object, such as a drop cable, to be strung or wired in a simple manner and can efficiently transmit the tension when attached.

Means for Solving the Problems

To solve the above problems, a tension transmitting device of the present invention is a tension transmitting device for transmitting, to a target object such as a drop cable to be strung or wired, tension used during stringing or wiring operation of the drop cable, the tension transmitting device comprising: a covering body that is placed over the target object from a side thereof; and a tension transmission belt having a first end secured on a first end side of the covering body and a second end used as a free end, the tension transmission belt directly or indirectly receiving the tension during the stringing or wiring operation on a free end side thereof, wherein the free end side of the tension transmission belt extends from a secured portion thereof secured to the covering body so as to run on a covering surface side of the covering body and is wound around the target object, the target object being covered with the covering body on the covering surface side thereof, and wherein the covering body includes a slit provided on a second end side thereof, the slit having a side receiving opening through which the tension transmission belt is received in a width direction, the slit being provided such that the tension transmission belt running on the covering surface side on which the tension transmission belt is wound around the target object is drawn toward a non-covering surface side of the covering body.

In such a configuration, the tension transmission belt that extends from the covering body so as to run on the target object-covering surface side thereof is secured to the covering body, and the secured portion side of the tension transmission belt is wound around the target object such as a drop cable to which the tension is transmitted. The wound tension transmission belt is pulled toward the free end side relative to the target object when the necessity arises. Then on the first end side of the covering body on which the tension transmission belt is secured, the covering surface side of the covering body is attracted toward the target object. The tension transmission belt wound around the target object includes an intermediate portion extending from the wound portion of the belt toward the free end side. The intermediate portion is inserted into the slit provided on the second end side of the covering body through the side receiving opening formed on the side of the covering body until the intermediate portion reaches the inner portion of the slit that extends in the width direction of the covering body. This can be achieved without routing the free end side of the intermediate portion and insertion operation in the lengthwise direction. By inserting the intermediate portion of tension transmission belt into the slit, the tension transmission belt passes through the covering body from the covering surface side on which the belt is wound around the target object and is drawn on the non-covering surface side. In this manner, the tension transmitting device is attached to the target object. In this state, when the free end side of the tension transmission belt is pulled by hand toward the drawn side away from the covering body, the target object on the second end side of the covering body is attracted toward the covering surface, so that the tightness of the winding around the target object is increased. Therefore, a more stable attached state is obtained.

In the tension transmitting device in the above attached state, when tension for pulling up the tension transmission belt to the mounting point on a utility pole, for tensioning the belt, or for wiring work is directly or indirectly applied to the free end side of the tension transmission belt, frictional resistance that depends on the tightness of the winding of the tension transmission belt around the target object and the winding contact area in the above attached state is increased. Therefore, the tension transmission belt is tightly wound around the target object. In this state, the covering body is more strongly attracted toward the target object, and the wound portion of the tension transmission belt around the target object is stretched toward the tension side. The tension transmission belt is thereby brought into surface pressure contact with the target object, and the tension can be reliably transmitted to the target object.

In the above configuration, the slit may allow the tension transmission belt to slide in the lengthwise direction thereof when tension is applied to the free end side of the received tension transmission belt.

In the above configuration, the tension exerted on the tension transmission belt acts to stabilize the tension transmission belt drawn from the slit of the covering body in the drawing direction parallel to the covering body and the target object. This causes the tension transmission belt passing through the slit from the covering surface side of the covering body and drawn on the non-covering surface side to be bent into a Z-like shape, which may cause drawing resistance. However, since the slit allows the tension transmission belt to slide in its lengthwise direction, the drawing resistance is reduced. Therefore, without a special design for the direction of the tension exerted, the attraction of the covering body toward the target object and the tight winding of the tension transmission belt around the target object can be smoothly achieved by applying the tension.

In the above configuration, the covering surface of the covering body may be a concave surface that conforms to the target object.

In such a configuration, since the covering surface of the covering body is a concave surface that substantially conforms to the target object, the covering surface has a self alignment function that allows self alignment with the target object, so that the covering body is easily and stably placed over the external circumference of the wound portion of tension transmission belt around the target object without misalignment. Therefore, transmission failure of the tension due to attachment failure does not occur, and the wound portion of the tension transmission belt around the target object can be protected from an accidental external force applied during, for example, the work for stringing the aerial target object.

In the above configuration, the slit may have a side slit region having a curved shape gradually bent from the side receiving opening of the covering body toward the second end side, and the side slit region may be connected to a central slit region aligned substantially in the width direction of the covering body.

In such a configuration, the side slit region that receives the intermediate portion of the tension transmission belt through the side receiving opening of the slit provided on the side of the covering body has a curved shape that is gradually bent from the side receiving opening toward the second end side, as described above. The intermediate portion of the tension transmission belt enters the central slit region that is continuous with the side slit region and aligned substantially in the width direction of the covering body. The intermediate portion of the tension transmission belt pulled toward the free end side or tensioned is bent in a direction opposite to the pulling direction, i.e., toward the side receiving opening of the covering body. Since the above relation is satisfied, the tension transmission belt is prevented from moving from the central slit region to the side slit region side and from escaping from the slit through the side slit region and the receiving opening. The tension transmission belt may not reach the central slit region, may be located in the side slit region, or may be partially caught by the side slit region. Even in such a case, when the tension transmission belt is pulled or tensioned, the curved shape of the side slit region generates a force component toward the central slit in the lengthwise pressure contact force exerted on the tension transmission belt drawn from the slit, and the tension transmission belt is moved toward the central slit region.

In the above configuration, the tension transmission belt may extend from the secured portion on the covering body so as to run on the non-covering surface side of the covering body, then pass through an elongated hole provided in the covering body, and extend on the covering surface side of the covering body.

In such a configuration, the tension applied to the free end side of the tension transmission belt is prevented from being directly applied to the secured portion of the tension transmission belt that is secured to the covering body. More specifically, the tension is dispersed and reduced by the drawing resistance generated at a guiding portion of the covering body that guides the tension transmission belt to the elongated hole and is provided upstream of the secured portion and by the tensile frictional resistance that also generates drawing resistance and is caused by pressure contact between the tension transmission belt and the non-covering surface between the secured portion and the guiding portion. In this manner, the concentration of the tension on the secured portion can be relaxed.

In the above configuration, the elongated hole may be inclined with respect to a lengthwise direction of the covering body.

In such a configuration, the tension transmission belt extending from the secured portion and passing through the elongated hole from the non-covering surface side of the covering body is drawn so as to extend on the covering surface side and is wound around the target object. In this case, the tension transmission belt is inclined in the lengthwise direction of the covering body and the target material so as to be aligned in the direction of the elongated hole of the covering body and extends on the covering surface side. Therefore, the tension transmission belt is easily inclined in the oblique direction for winding it around the target object and can be smoothly wound without unnatural wrinkles.

In the above configuration, the first end of the tension transmission belt may be secured on a first edge side of the covering body so as to be parallel to the lengthwise direction of the covering body, and the elongated hole may be provided on a second edge side of the covering body that is opposite to the secured portion at the first end of the tension transmission belt.

In such a configuration, the tension transmission belt extends in the widthwise direction of the covering body from the secured portion (the first end) that is parallel to the lengthwise direction of the covering body and provided on the first edge side of the covering body toward the elongated hole provided on the second edge side opposite to the secured portion. Then the tension transmission belt passes through the elongated hole, greatly changes the extending direction toward the side on which the belt is wound around the target object, and receives tension on the free end side. This tension is greatly dispersed by large drawing resistance caused by the elongated hole due to the large change in the direction of the tension transmission belt from the winding direction of the belt around the target material to the width direction of the covering body that is directed from the elongated hole toward the secured portion. The concentration of the tension on the secured portion can thereby be further reduced.

Effects of the Invention

In the tension transmitting device of the present invention, the tension transmission belt that extends from the covering body and runs on the covering surface side thereof is simply wound around the target object to which tension is to be transmitted from the tension transmission belt. The intermediate portion of the tension transmission belt that is drawn from the wound portion thereof is simply inserted into the slit provided on the second end side of the covering body from the side portion of the slit, and the insertion does not require routing of the free end side of the intermediate portion and insertion operation in the lengthwise direction. With the above procedure or the reverse procedure, the attachment to and detachment from the target object can be performed in an efficient manner, and the time required for stringing or wiring operation, such as the work for stringing an aerial drop cable, can be reduced.

In the attached state, the tensile force or tension applied to the tension transmission belt drawn from the slit of the covering body toward the non-covering surface side causes the tension transmission belt to be tensioned between the secured portion on the covering body and the slit. This causes the covering body to be attracted toward the target object side, and the tension transmission belt is tightly wound around the target object and brought into surface pressure contact therewith. In this case, local pressurization caused by, for example, a rope tightly wrapped around the target object in an intersecting manner does not occur, so that the target object is not damaged. Therefore, a large frictional force between the tension transmission belt and the target object can be easily obtained, and the tension applied to the free end side of the tension transmission belt is reliably transmitted to the target object without play and slippage, so that stringing or wiring operation, such as the work for stringing an aerial drop cable, can be smoothly performed in an efficient manner.

DESCRIPTION OF REFERENCE NUMERALS 1 tension transmitting device
2 drop cable
3 covering body
3a covering surface
3b non-covering surface
3c securing wall
4 tension transmission belt
5 secured portion
6 slit
6a side receiving opening
6b projection
6c side slit region
6d central slit region
7 wound portion
11 elongated hole
12 through hole
13 string
15 pin

BEST MODE FOR CARRYING OUT THE INVENTION

Hereinafter, embodiments of a tension transmitting device of the present invention are described with reference to FIGS. 1 to 4 to provide an understanding of the invention.

The tension transmitting device in the present embodiment is an exemplary tension transmitting device used mainly when a drop cable formed of 2 to 3 lightly twisted low-voltage wires is strung between a utility pole and, for example, a target house as described above. The tension transmitting device transmits the tension used during the wiring work to the drop cable. However, the present invention is not limited thereto and is applicable to similar general stringing and wiring operations for other wires and cables such as bypass cables.

Figure 1:
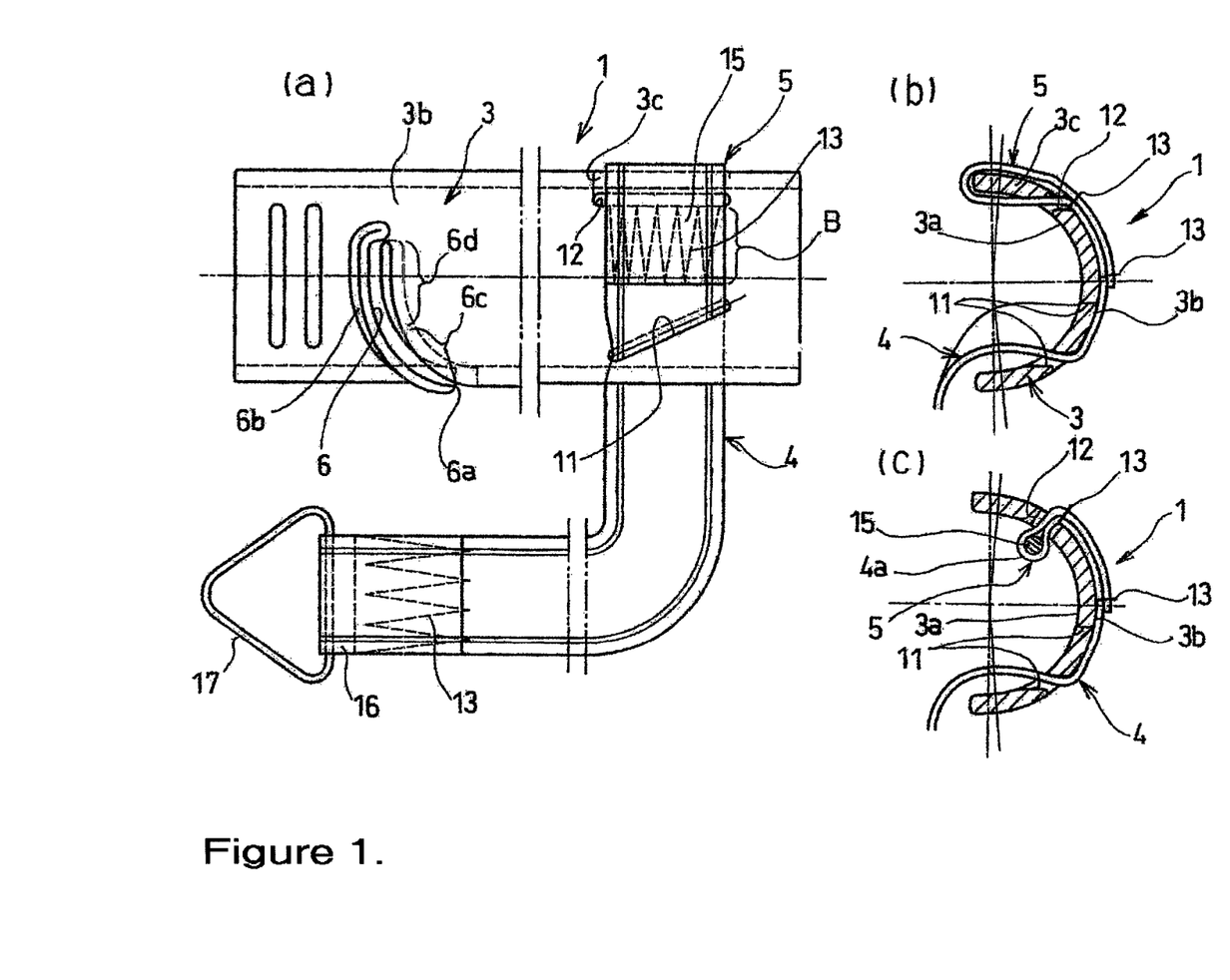
FIG. 1 shows a tension transmitting device according to an embodiment of the present invention, (a) being a plan view, (b) being a cross-sectional view of a secured portion, illustrating an exemplary manner of securing a tension transmission belt to a covering body, (c) being a cross-sectional view of the secured portion, illustrating another exemplary manner of securing.
Figure 2:
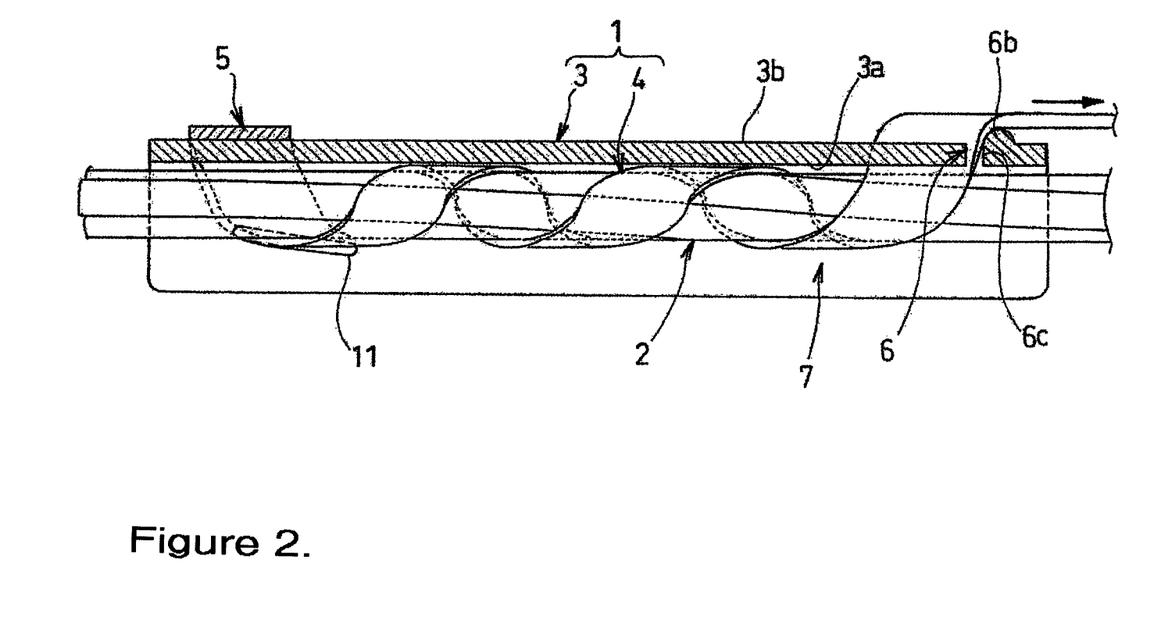
FIG. 2 is a cross-sectional view illustrating a tension transmitting state of the tension transmitting device.

FIGS. 1(a) and 1(b) show an exemplary tension transmitting device 1. The tension transmitting device 1 includes: a covering body 3 that is placed over a target drop cable 2 from the side thereof as shown in FIG. 2; and a tension transmission belt 4 having a first end secured on a first end side of the covering body 3 and a second end used as a free end, the tension transmission belt 4 directly or indirectly receiving the tension used during the wiring operation on the free end side thereof. The covering body 3 and the tension transmission belt 4 are members used for the electrical work for stringing the target aerial drop cable 2, and insulating materials are used for these members for electrical safety.

The covering body 3 is used to tightly wind the tension transmission belt 4 around the external circumference of the drop cable 2, as shown in FIG. 2, by utilizing, for example, a tensioning action between the first and second end sides of the covering body 3 under the tension applied to the tension transmission belt 4 to thereby transmit the tension for stringing the drop cable 2. The covering body 3 is made of polycarbonate to ensure strength enough to resist the tension, and its thickness is set to about 5 mm. The covering body 3 has a semi-circular cross-sectional shape surrounding substantially half the external circumference of the drop cable 2 to improve bending stiffness. Therefore, when a covering surface 3a having a concave groove shape is placed over the drop cable 2 as shown in FIG. 2, a mutual alignment function is exerted therebetween, and the covering surface 3a is stably placed over the drop cable 2 without misalignment. The arc radius of the covering surface 3a is about 25 mm, which is large enough to receive the drop cable 2 having the size described above. A non-covering surface 3b is concentric to the covering surface 3a and has a radius of about 30 mm.

The tension transmission belt 4 is tightly wound around, for example, the external circumference of the drop cable 2 to transmit tension. The tension transmission belt 4 must have characteristics such as flexibility for allowing it to be easily wound and resistance to tension and is a flat belt having a woven or braided structure of polyester fibers. A knitted structure may be employed, but the elongation thereof must be suppressed. Otherwise, a difficulty arises in tightly winding the belt around the drop cable 2 and in attracting the covering body 3 toward the drop cable 2. A flat belt having a longitudinally irregular surface structure for preventing slippage is effective to prevent slippage when tension is applied to the tension transmission belt 4 and slippage when the tension is transmitted to the external circumference of the drop cable 2 through the tightly wound belt. However, the hardness and the degree of irregularity of the belt must be such that a local external force that can damage the twisted wires of the drop cable 2 is not applied thereto.

In particular, as shown in FIGS. 1(a) and (b), the tension transmission belt 4 of the tension transmitting device 1 in the present embodiment is configured such that the free end side of the belt extends from a secured portion 5 secured to the covering body 3 so as to run on the covering surface 3a side of the covering body 3 on which the covering body 3 is placed over the drop cable 2. The free end side of the belt is wound around the drop cable 2 as shown in FIG. 2. To achieve the above configuration, the covering body 3 includes, on the second end side, a slit 6 with a side receiving opening 6a. The slit 6 is designed such that the tension transmission belt 4 is received through the side receiving opening 6a so as to pass therethrough from the covering surface 3a side on which the belt is wound around the drop cable 2 and is drawn on the non-covering surface 3b side, as shown in FIGS. 1(a) and (b).

Figure 3:
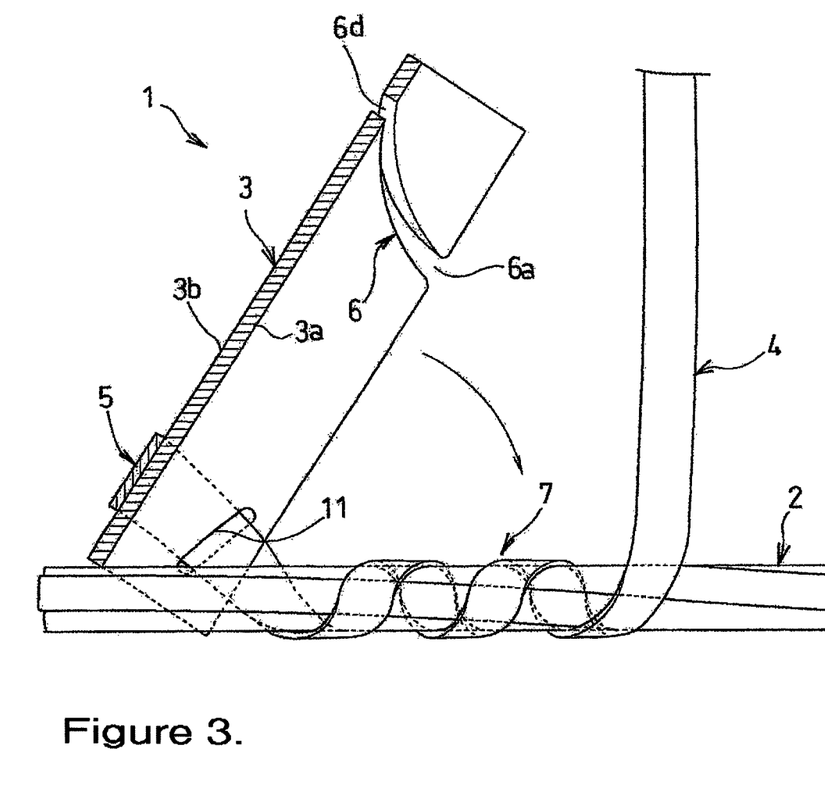
FIG. 3 is a side view illustrating exemplary operation of winding the tension transmission belt of the tension transmitting device.
Figure 4:
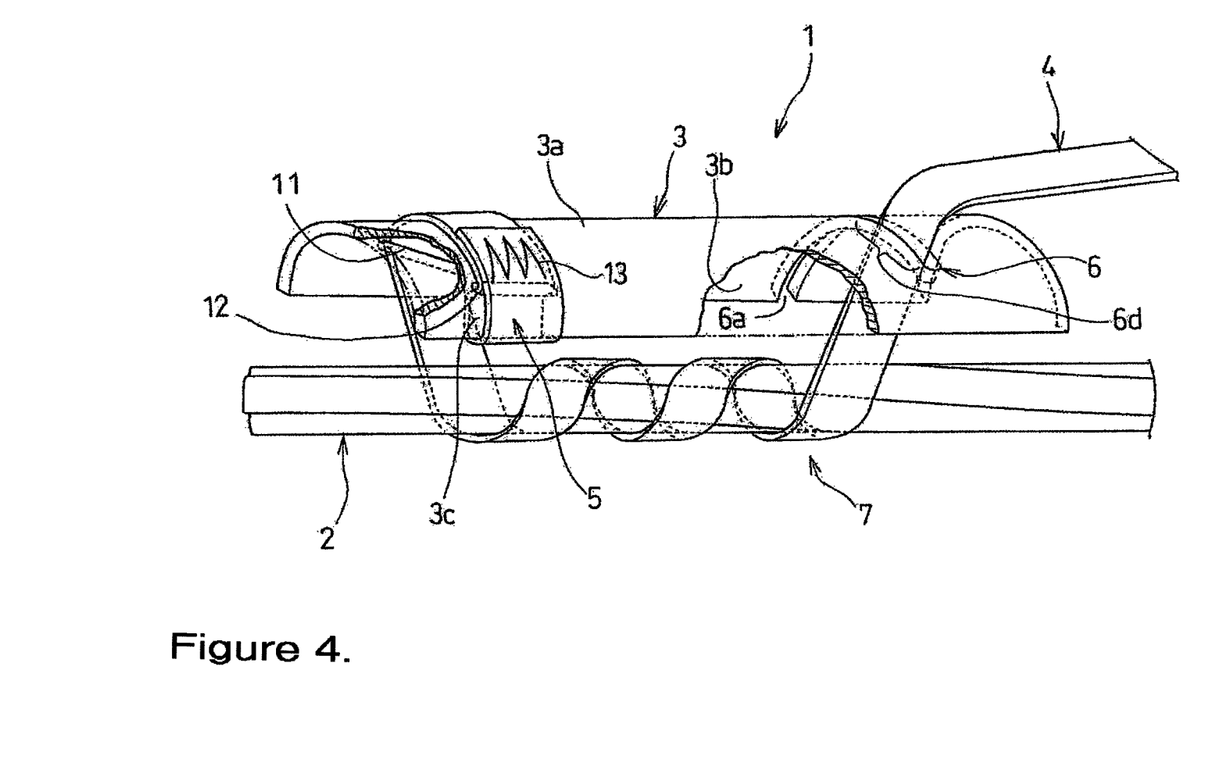
FIG. 4 is a diagram illustrating the relation among the covering body of the tension transmitting device, a target drop cable, the tension transmission belt extending from the covering body, wound around the target drop cable, and drawn from the covering body, the relation being illustrated with the covering body spaced apart from the drop cable.

The tension transmission belt 4 extending on the covering surface 3a side of the covering body 3 is basically in a free state, i.e., free from the constraints of other members, as in the covering body 3. Therefore, the tension transmission belt 4 can be freely wound around the external circumference of the drop cable 2. For example, as shown in FIGS. 3 and 4, the secured portion 5 side of the tension transmission belt 4 that is secured to the covering body 3 is wound around the external circumference of the target drop cable 2 to which tension is to be applied. The wound tension transmission belt 4 is pulled or tensioned toward the free end side relative to the drop cable 2 when the necessity arises. Then on the first end side of the covering body 3 on which the tension transmission belt 4 is secured, the covering surface 3a side of the covering body 3 is attracted toward the drop cable 2.

The tension transmission belt 4 wound around the drop cable 2 includes an intermediate portion extending from the winding end of a wound portion 7 wound around the drop cable 2 toward the free end side. The intermediate portion is inserted into the slit 6 provided on the second end side of the covering body 3 through the side receiving opening 6a formed on the side of the covering body 3 until the intermediate portion reaches the inner portion of the slit 6 that extends in the width direction of the covering body 3. This can be achieved without routing the free end side of the intermediate portion and insertion operation in the lengthwise direction. By inserting the intermediate portion of the tension transmission belt 4 into the slit 6 in the width direction, the tension transmission belt 4 passes through the covering body 3 from the covering surface 3a side on which the belt 4 is wound around the drop cable 2 and is drawn on the non-covering surface 3b side, as shown in FIG. 2.

In this manner, the tension transmitting device 1 is attached to the drop cable 2. In this state, when the free end side of the tension transmission belt 4 is pulled by hand toward the drawn side away from the covering body 3, the drop cable 2 on the second end side of the covering body 3 is attracted toward the covering surface 3a, so that the tightness of the winding around the drop cable 2 is increased. Therefore, a more stable attached state is obtained.

In the tension transmitting device 1 in the above attached state, when tension for pulling up the tension transmission belt 4 to the mounting point of a utility pole, for tensioning the belt, or for wiring work is directly or indirectly applied to the free end side of the tension transmission belt 4, frictional resistance that depends on the tightness of the winding of the tension transmission belt 4 around the drop cable 2 and the winding contact area in the above attached state is increased. Therefore, the tension transmission belt 4 in the state shown in FIG. 4 is tightly wound around the drop cable 2 as shown in FIG. 3. In this state, the covering body 3 is more strongly attracted toward the drop cable 2 side, and the wound portion 7 of the tension transmission belt 4 around the drop cable 2 is stretched toward the tension side. The tension transmission belt 4 is thereby brought into surface pressure contact with the drop cable 2, and the tension can be reliably transmitted to the drop cable 2.

As described above, the tension transmission belt 4 that extends from the covering body 3 and runs on the covering surface 3a side thereof is simply wound around the target drop cable 2 to which tension is to be transmitted from the tension transmission belt 4. The intermediate portion of the tension transmission belt 4 that is drawn from the wound portion 7 is simply inserted into the slit 6 provided on the second end side of the covering body 3 from the side portion of the slit 6, and the insertion does not require routing of the free end side of the intermediate portion and insertion operation in the lengthwise direction. With the above procedure or the reverse procedure, the attachment to and detachment from the target drop cable 2 can be performed in an efficient manner, and the time required for the work for stringing the aerial cable can be reduced.

In the attached state, the tensile force or tension applied to the tension transmission belt 4 drawn from the slit 6 of the covering body 3 toward the non-covering surface 3a causes the tension transmission belt 4 to be tensioned between the secured portion 5 on the covering body 3 and the slit 6. This causes the covering body 3 to be attracted toward the target drop cable 2 side, and the tension transmission belt 4 is tightly wound around the target drop cable 2 and brought into surface pressure contact therewith. In this case, local pressurization caused by, for example, a rope tightly wound around the target drop cable 2 in an intersecting manner does not occur, so that the target drop cable 2 is not damaged. Therefore, a large frictional force between the tension transmission belt 4 and the target drop cable 2 can be easily obtained, and the tension applied to the free end side of the tension transmission belt 4 is reliably transmitted to the target drop cable 2 without play and slippage, so that the work for stringing the aerial cable can be smoothly performed in an efficient manner.

In FIG. 4, to clearly show the relation between the covering body 3 and the tension transmission belt 4 wound around the drop cable 2, the covering body 3 is greatly spaced apart from the drop cable 2 around which the tension transmission belt 4 is wound. This state is inconvenient to draw the free end side of the tension transmission belt 4 from the slit 6 to attract the covering body 3 toward the drop cable 2 so that the tension transmission belt 4 is tightly wound around the drop cable 2 to the extent that the tension can be transmitted.

More specifically, to obtain the above-described tension transmission state, it is preferable that the secured portion 5 side of the tension transmission belt 4 secured to the drop cable 2 be wound around the drop cable 2, because the tension transmission belt 4 can be tightly wound into the tension transmission state. When the tension transmission belt 4 on the covering body 3 side is routed around the drop cable 2, the tension transmission state can be easily achieved within a small routing space. Even when the free end side of the tension transmission belt 4 is routed, the routing space necessary for winding can be reduced when the transmission belt 4 used is wound into a roll, and the tension transmission state can be easily achieved.

In particular, when the drop cable 2 is supported overhead, the work is performed at a high place. However, the drop cable 2 is stable, and both hands of the worker are free. Therefore, the attachment operation of the tension transmitting device 1 to the drop cable 2 (including winding the tension transmission belt around the drop cable 2 and attracting the covering body 3 toward the drop cable 2 side) can be performed easily. Even when the drop cable 2 lies on the ground, the attachment operation can be performed in the same manner as in the work at a high place by supporting the necessary portion of the drop cable 2 in a lifted state so that both hands of the worker are free.

Even when the drop cable 2 lies on the ground, the tension transmitting device 1 can be easily attached and brought into the tension transmission state in the following manner. First, the drop cable 2 is lifted by one hand while the covering body 3 is placed over the drop cable 2. In this state, the tension transmission belt 4 extending toward the covering surface 3a side of the covering body 3 is wound around the drop cable 2 using the other hand. Then the intermediate portion of the tension transmission belt 4 that is drawn from the wound portion 7 is inserted in the width direction into the inner portion of the slit 6 through the receiving opening 6a. In this manner, the tension transmitting device 1 is held in a temporary attached state and stabilized. Then the tension transmission belt 4 is tightly wound around the drop cable 2 using both hands so that the covering body 3 is attracted toward the drop cable 2. In one example, a tension transmission belt 4 having a width of about 33 mm was used. When the tension transmission belt 4 was wound about 3 turns, the tension necessary to string a low-voltage drop cable 2 was successfully transmitted. However, the invention is not limited thereto.

When the tension transmission belt 4 is wound around or unwound from the drop cable 2, the winding or unwinding operation is facilitated by separating the second end of the covering body 3 away from the drop cable 2 as shown in FIG. 3. When the first end side of the covering body 3 is brought close to the drop cable 2 in the initial stage of winding, the subsequent winding operation can be easily performed while initial tension is transmitted. In addition, when the tension transmission belt 4 is inserted into the slit 6 and drawn therefrom at the end of the winding operation, the second end side of the covering body 3 can be easily attracted toward the drop cable 2 side, and the predetermined attached state can thereby be obtained.

The slit 6 is designed such that the tension transmission belt 4 received therein is allowed to slide in its lengthwise direction when tension is applied to the free end side of the tension transmission belt 4. The tension exerted on the tension transmission belt 4 acts to stabilize the tension transmission belt 4 drawn from the slit 6 of the covering body 3 in the drawing direction parallel to the covering body 3 and the drop cable 2. This causes the tension transmission belt 4 passing through the slit 6 from the covering surface 3a side of the covering body 3 and drawn on the non-covering surface 3b side to be bent into a Z-like shape shown in FIG. 2, which may cause drawing resistance. However, since the slit 6 allows the tension transmission belt to slide in its lengthwise direction, the drawing resistance is reduced. Therefore, without a special design for the direction of the tension exerted, the attraction of the covering body 3 toward the drop cable 2 and the tight winding of the tension transmission belt 4 around the drop cable 2 can be smoothly achieved by applying the tension. In the case shown in FIGS. 1(a) and 2, a projection 6b having a substantially semi-circular cross-section is formed on a tension-side opening edge of the opening of the slit 6 on the non-covering surface 3b side, i.e., an opening edge that is a corner at which the tension transmission belt 4 drawn from the slit 6 and tensioned undergoes strong drawing resistance. Since the projection 6b is provided, the corner is not sharp but is rounded, so that the sliding movement of the tension transmission belt 4 is facilitated. In this manner, the drawing resistance is significantly reduced.

Therefore, when tension is applied, the tension transmission belt 4 can smoothly slide inside the slit 6 without undergoing large drawing resistance and damage and is tightly wound around the covering body 3 according to the tension applied to the secured portion 5 on the covering body 3, so that the applied tension can be reliably transmitted to the drop cable 2 without slippage. Therefore, the efficiency of the work for stringing the drop cable 2 itself can be improved.

The slit 6 has a side slit region 6c having a curved shape gradually bent from the side receiving opening 6a of the covering body 3 toward the second end side, and the side slit region 6c is connected to a central slit region 6d aligned substantially in the width direction of the covering body 3. The side slit region 6c that receives the intermediate portion of the tension transmission belt 4 through the side receiving opening 6a of the slit 6 provided on the side of the covering body 3 has a curved shape that is gradually bent from the side receiving opening 6a toward the second end side. The intermediate portion of the tension transmission belt 4 enters the central slit region 6d that is continuous with the side slit region 6c and aligned substantially in the width direction of the covering body 3. The intermediate portion of the tension transmission belt 4 pulled toward the free end side or tensioned is bent in a direction opposite to the pulling direction, i.e., toward the side receiving opening 6a of the covering body 3. Since the above relation is satisfied, the tension transmission belt 4 is prevented from moving from the central slit region 6d to the side slit region 6c side and from escaping from the slit 6 through the side slit region 6c and the receiving opening 6a. The tension transmission belt 4 may not reach the central slit region 6d, may be located in the side slit region 6c, or may be partially caught by the side slit region 6c. Even in such a case, when the tension transmission belt 4 is pulled or tensioned, the curved shape of the side slit region 6c generates a force component toward the central slit 6d in the lengthwise pressure contact force exerted on the tension transmission belt 4 drawn from the slit 6, and the tension transmission belt 4 is moved toward the central slit region 6d. Therefore, even when the slit 6 has the receiving opening 6a on the side of the covering body 3, the tension transmission belt 4 is reliably prevented from escaping from the slit 6 during the tension transmission operation.

As shown in FIGS. 1(a) and (b), the tension transmission belt 4 extends from the secured portion 5 on the covering body 3 so as to run on the non-covering surface 3b side of the covering body 3, then passes through an elongated hole 11 provided in the covering body 3, and extends on the covering surface 3a side of the covering body 3. In this manner, the tension applied to the free end side of the tension transmission belt 4 is prevented from being directly applied to the secured portion 5 of the tension transmission belt 4 that is secured to the covering body 3. More specifically, the tension is dispersed and reduced by the drawing resistance generated at a guide portion of the covering body 3 that guides the tension transmission belt 4 to the elongated hole 11 and is provided upstream of the secured portion 5 and by the tensile frictional resistance that also generates drawing resistance and is caused by pressure contact between the tension transmission belt 4 and the non-covering surface 3b between the secured portion 5 and the guiding portion. In this manner, the concentration of the tension on the secured portion 5 can be relaxed. Therefore, the tension transmission belt 4 is tensioned from the secured portion 5 secured to the covering body 3 by the tension applied to the tension transmission belt 4 and is thereby tightly wound, so that the tension is transmitted to the drop cable 2. However, fatigue and deterioration due to the tension concentration on the secured portion 5 is reduced, and the life is thereby elongated.

In particular, as shown in FIG. 1(a), the elongated hole 11 is inclined with respect to the lengthwise direction of the covering body 3. The tension transmission belt 4 extending from the secured portion 5 and passing through the elongated hole 11 from the non-covering surface 3b side of the covering body 3 is drawn so as to extend on the covering surface 3a side and is wound around the drop cable 2. In this case, the tension transmission belt 4 is inclined in the lengthwise direction of the covering body 3 and the drop cable 2 so as to be aligned in the direction of the elongated hole 11 of the covering body 3 and extends on the covering surface 3a side. Therefore, the tension transmission belt 4 is easily inclined in the oblique direction for winding it around the drop cable 2 and can be smoothly wound without unnatural wrinkles and overlap. Therefore, the concentration of the tension on the secured portion 5 is relaxed by the facing relation between the secured portion 5 and the elongated hole 11 in the width direction the covering body 3. In addition, since wrinkles and unnatural overlap are not formed in the intermediate portion of the tension transmission belt 4 that is wound around the drop cable 2 and located upstream of the elongated hole 11, the twisted wires of the drop cable 2 are not locally pressurized during the transmission of tension, so that the twisted wires are prevented from being damaged and fatigued.

As shown in FIGS. 1(a) and (b), the first end of the tension transmission belt 4 is secured on a first edge side of the covering body 3 so as to be parallel to the lengthwise direction of the covering body 3, and the elongated hole 11 is provided on a second edge side of the covering body 3 that is opposite to the secured portion 5 at the first end of the tension transmission belt 4. The tension transmission belt 4 extends in the widthwise direction of the covering body 3 from the secured portion 5 (the first end) that is parallel to the lengthwise direction of the covering body 3 and provided on the first edge side of the covering body 3 toward the elongated hole 11 provided on the second edge side opposite to the secured portion. Then the tension transmission belt 4 passes through the elongated hole 11, greatly changes the extending direction toward the winding surface 3a side on which the belt is wound around the drop cable 2, and receives tension on the free end side. This tension is greatly reduced by large drawing resistance caused by the elongated hole due to the large change in the direction of the tension transmission belt 4 from the winding direction of the transmission belt 4 around the drop cable 2 to the width direction of the covering body 3 that is directed from the elongated hole 11 toward the secured portion 5. The concentration of the tension on the secured portion 5 can thereby be further reduced.

As shown in FIGS. 1(a) and (b), a securing wall 3c is formed between the first edge of the covering body 3 and a through hole 12 formed along the first edge. The first end of the tension transmission belt 4 passes through the through hole 12, and the tension transmission belt 4 is wound around the securing wall 3c. The tension transmission belt 4 is secured at the secured portion 5 by stitching it into a bag-like shape with a resin fiber string 13. The stitches of the string 13 are placed at small intervals and formed in a zigzag pattern with an amplitude oriented in the tension direction, and the stitching width B of a stitched portion 15 in the tension direction is sufficiently large. In this manner, the tension does not cause the stitches to come undone. Any securing method may be used. In an example shown in FIG. 1(c), the first end side of the tension transmission belt 4 is folded in two and passes through the through hole 12 of the covering body 3 from the non-covering surface 5b side toward the covering surface 5a side. A pin 15 longer than the elongated hole 12 is inserted into a folded portion 4a protruding toward the covering surface 5a side, and the opposite ends of the pin 15 longer than the elongated hole 2 abut against the covering surface 5a. Therefore, the pin 15 is prevented from falling off, and the tension transmission belt 4 is thereby secured. The folded overlapping portion protruding from the elongated hole 12 toward the non-covering surface 5b side is stitched into a bag-like shape with a string 13 under the same conditions as those described above. In this case, the stitching operation using the string 13 can be made on the tension transmission belt 4 before its folded portion 4a is inserted through the elongated hole 12. Therefore, the stitching operation can be made easier than that shown in FIGS. 1(a) and (b). Of course, ultrasonic welding may be used instead of stitching and may be used together with stitching.

Finally, when tension is directly applied to the tension transmission belt 4 by man power or the like, the free end side serving as a tensioned side may be straight or may have a loop portion for allowing a hand to pass therethrough. In the example shown in FIG. 1(a), a structural steel-made connection ring 17 is connected to a bag-like portion 16 that is formed at the free end of the tension transmission belt 4 by stitching it with a string 13 as in the above-described case. The connection ring 17 is connected to a connecting tool such as a hook of a tension source such as a manual winding apparatus or a stringing apparatus in a simple and reliable manner to perform wiring operation including pulling up the tension transmission belt 4 to the mounting point of a utility pole, tensioning the belt 4, and adjusting the sag of the belt 4 to a predetermined value. In this manner, the length of the tension transmission belt 4 can be adjusted to the minimum length required to transmit tension to the drop cable 2 to which the tension transmitting device 1 is attached, irrespective of the type of the tension source. Accordingly, the tension transmitting device 1 is easily provided and easily handled.

INDUSTRIAL APPLICABILITY

The tension transmitting device of the present invention can be easily attached to and detached from a drop cable when a low-voltage drop cable is strung and can transmit tension in a reliable manner during attachment without causing fatigue and damage to the drop cable.

The invention claimed is:

1. A tension transmitting device for transmitting, to a target object to be strung or wired, tension used during stringing or wiring operation of target object, the tension transmitting device comprising:
    a covering body that is placed over the target object from a side thereof; and
    a tension transmission belt having a first end secured on a first end side of the covering body and a second end used as a free end, the tension transmission belt directly or indirectly receiving the tension during the stringing or wiring operation on a free end side thereof, wherein
    the free end side of the tension transmission belt extends from a secured portion thereof secured to the covering body so as to run on a covering surface side of the covering body and is wound around the target object, the target object being covered with the covering body on the covering surface side thereof, and wherein
    the covering body comprises a stiff semicircular cross-sectional shape surrounding substantially half the external circumference of the target object; and
    the covering body includes a slit provided on a second end side thereof, the slit having a side receiving opening through which the tension transmission belt is received in a width direction, the slit being provided such that the tension transmission belt running on the covering surface side on which the tension transmission belt is wound around the target object is drawn toward a non-covering surface side of the covering body.

2. The tension transmitting device according to claim 1, wherein the covering surface of the covering body is a concave surface that conforms to the target object.

3. The tension transmitting device according to claim 1, wherein:
    the tension transmission belt extends from the secured portion on the covering body so as to run on the non-covering surface side of the covering body then passes through an elongated hole provided in the covering body, and extends on the covering surface side of the covering body; and
    the elongated hole is inclined with respect to a lengthwise direction of the covering body.

4. The tension transmitting device according to claim 2, wherein:
    the tension transmission belt extends from the secured portion on the covering body so as to run on the non-covering surface side of the covering body then passes through an elongated hole provided in the covering body, and extends on the covering surface side of the covering body; and the elongated hole is inclined with respect to a lengthwise direction of the covering body.

* * * * *